(12) United States Patent
Dickerman et al.

(10) Patent No.: US 7,805,433 B2
(45) Date of Patent: Sep. 28, 2010

(54) MULTIDIMENSIONAL CUBE FUNCTIONS

(75) Inventors: Howard J. Dickerman, Bellevue, WA (US); Brian W. Boon, Redmond, WA (US); Charles D. Ellis, Seattle, WA (US); Kaicheng Hu, Bellevue, WA (US); Robert G. Hawking, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 412 days.

(21) Appl. No.: 11/251,598

(22) Filed: Oct. 14, 2005

(65) Prior Publication Data
US 2007/0088691 A1 Apr. 19, 2007

(51) Int. Cl.
G06F 7/00 (2006.01)
G06F 17/00 (2006.01)

(52) U.S. Cl. .................. 707/713; 707/706; 707/736; 715/255

(58) Field of Classification Search .................. 707/103, 707/4, 2, 5; 715/255–272
See application file for complete search history.

(56) References Cited

U.S. PATENT DOCUMENTS

| | | | |
|---|---|---|---|
| 5,175,810 A | 12/1992 | Young et al. ................. 715/217 |
| 5,280,575 A | 1/1994 | Young et al. ................. 715/255 |
| 5,845,300 A | 12/1998 | Comer et al. ................. 715/203 |
| 5,874,955 A | 2/1999 | Rogowitz et al. ............. 345/589 |
| 6,317,750 B1 * | 11/2001 | Tortolani et al. ......... 707/103 R |
| 6,377,965 B1 | 4/2002 | Hachamovitch et al. .... 715/203 |
| 6,460,059 B1 | 10/2002 | Wisniewski ................. 715/212 |
| 6,564,213 B1 | 5/2003 | Ortega et al. ................... 707/5 |
| 6,626,959 B1 | 9/2003 | Moise et al. ................. 715/522 |
| 6,631,497 B1 | 10/2003 | Jamshidi et al. ............. 715/205 |
| 6,640,234 B1 | 10/2003 | Coffen et al. ................ 715/219 |
| 6,728,724 B1 | 4/2004 | Megiddo et al. ............. 707/102 |
| 6,757,867 B2 | 6/2004 | Bauchot et al. ............. 715/220 |
| 6,829,607 B1 | 12/2004 | Tafoya et al. ................... 707/6 |
| 6,907,428 B2 | 6/2005 | Fitzpatrick et al. ........... 707/10 |
| 7,043,476 B2 | 5/2006 | Robson ......................... 707/7 |
| 7,324,991 B1 * | 1/2008 | Anjur ............................ 707/5 |
| 7,337,163 B1 * | 2/2008 | Srinivasan et al. ............. 707/3 |

(Continued)

FOREIGN PATENT DOCUMENTS

KR 10-0289065 5/1999

(Continued)

OTHER PUBLICATIONS

Office Action mailed Aug. 23, 2007, in U.S. Appl. No. 11/083,492, 12 pgs.

(Continued)

*Primary Examiner*—Debbie Le
*Assistant Examiner*—Bao G Tran
(74) *Attorney, Agent, or Firm*—Merchant & Gould, P.C.

(57) ABSTRACT

Cube functions may be used to obtain data from a multidimensional database. The cube functions may be contained within one or more cells of a spreadsheet. These cube functions behave similarly to the standard functions that may be included within a spreadsheet. Exemplary cube functions include obtaining: a cube member, a cube value, a cube set, a ranked member, a KPI, a member property and a count relating to a set. The cube functions within the spreadsheet may access the cube data from one or more multidimensional databases. Using the cube formulas in individual cells allows the user to add/delete rows and/or columns from within the spreadsheet.

13 Claims, 7 Drawing Sheets

U.S. PATENT DOCUMENTS

| | | |
|---|---|---|
| 7,415,481 B2 | 8/2008 | Becker et al. ............... 707/102 |
| 7,693,860 B2 | 4/2010 | Babanov et al. ............. 715/212 |
| 2002/0013786 A1 | 1/2002 | Machalek ................... 707/503 |
| 2002/0046131 A1 | 4/2002 | Boone et al. .................. 705/26 |
| 2002/0184260 A1 | 12/2002 | Martin et al. ............... 707/503 |
| 2002/0194217 A1 | 12/2002 | Hoffman et al. ............ 707/503 |
| 2003/0009649 A1 | 1/2003 | Martin et al. .................. 712/1 |
| 2003/0026143 A1 | 2/2003 | Brennan ..................... 365/200 |
| 2003/0033288 A1 | 2/2003 | Shanahan et al. .............. 707/3 |
| 2003/0055832 A1 | 3/2003 | Roccaforte ................. 707/100 |
| 2003/0055843 A1 | 3/2003 | Chiu ....................... 707/104.1 |
| 2004/0237029 A1 | 11/2004 | Medicke et al. ............. 715/503 |
| 2005/0010565 A1* | 1/2005 | Cushing et al. ................. 707/3 |
| 2005/0027750 A1 | 2/2005 | Martin et al. ............... 707/200 |
| 2005/0091206 A1 | 4/2005 | Koukerdjinian et al. ..... 715/203 |
| 2005/0165754 A1* | 7/2005 | Valliappan et al. ............. 707/3 |
| 2005/0165825 A1 | 7/2005 | Turski et al. ................ 707/102 |
| 2005/0183002 A1 | 8/2005 | Chapus ....................... 715/505 |
| 2005/0184260 A1 | 8/2005 | Fageraas et al. ............. 250/573 |
| 2005/0223027 A1 | 10/2005 | Lawrence et al. ....... 707/103 R |
| 2005/0223061 A1 | 10/2005 | Auerbach et al. ........... 709/206 |
| 2006/0010367 A1 | 1/2006 | Sattler et al. ................ 715/503 |
| 2006/0015805 A1 | 1/2006 | Humenansky et al. ...... 715/503 |
| 2006/0107196 A1 | 5/2006 | Thanu et al. ................ 715/503 |
| 2006/0129598 A1* | 6/2006 | Anjur et al. ................. 707/102 |
| 2006/0129929 A1 | 6/2006 | Weber et al. ................ 715/538 |
| 2006/0212469 A1 | 9/2006 | Babanov et al. ............. 707/102 |
| 2006/0293944 A1* | 12/2006 | Igelbrink et al. ............... 705/9 |
| 2007/0027876 A1* | 2/2007 | Graf ............................. 707/10 |
| 2007/0027904 A1* | 2/2007 | Chow et al. ................. 707/102 |
| 2007/0055922 A1 | 3/2007 | Martynov et al. ........... 715/210 |
| 2007/0061344 A1 | 3/2007 | Dickerman et al. ......... 707/100 |
| 2007/0168323 A1 | 7/2007 | Dickerman et al. ............ 707/2 |
| 2007/0208721 A1* | 9/2007 | Zaman et al. .................. 707/4 |
| 2007/0219956 A1 | 9/2007 | Milton .......................... 707/3 |

FOREIGN PATENT DOCUMENTS

| | | |
|---|---|---|
| WO | WO 03/088063 | 10/2003 |

OTHER PUBLICATIONS

Office Action mailed Feb. 21, 2008, in U.S. Appl. No. 11/083,492, 13 pgs.
Office Action mailed Jul. 24, 2008, in U.S. Appl. No. 11/083,492, 16 pgs.
Office Action mailed Jan. 6, 2009, in U.S. Appl. No. 11/083,492, 17 pgs.
Office Action mailed Apr. 14, 2009, in U.S. Appl. No. 11/222,928, 17 pgs.
Final Office Action mailed Sep. 3, 2008, in U.S. Appl. No. 11/222,928, 15 pgs.
Office Action mailed Feb. 4, 2008, in U.S. Appl. No. 11/222,928, 12 pgs.
Office Action mailed Feb. 19, 2008, in U.S. Appl. No. 11/325,372, 14 pgs.
Final Office Action mailed Nov. 12, 2008, in U.S. Appl. No. 11/325,372, 10 pgs.
Office Action mailed Jul. 13, 2009, in U.S. Appl. No. 11/325,372, 12 pgs.
Office Action mailed Oct. 10, 2007, in U.S. Appl. No. 11/268,048, 16 pgs.
Office Action mailed Jul. 22, 2008, in U.S. Appl. No. 11/268,048, 19 pgs.
Office Action mailed Feb. 24, 2009, in U.S. Appl. No. 11/268,048, 18 pgs.
Final Office Action mailed Sep. 23, 2009, in U.S. Appl. No. 11/268,048, 21 pgs.
International Search Report mailed Feb. 26, 2007, in PCT/US2006/034987, 10 pgs.
International Search Report mailed Sep. 26, 2003, in PCT/IB03/01444, 1 pg.
"Tutorial 26: MSAS: Office 2000 OLAP Components", http://www.exforsys.com/content/view/1349, last accessed Sep. 8, 2005, 7 pgs.
"What is XLCubed Explorer", http://www.xlcubed.com/explorer.htm, last accessed Sep. 8, 2005, 2 pgs.
"Excel Simplicity. Advanced OLAP Capabilities. Web Enabled.", http://paristech.com/index2.html, Sep. 8, 2005, 3 pgs.
"SPSS Base", http://www.spss-sa.com/products/body.htm, last accessed Sep. 8, 2005, 12 pgs.
Office Action mailed Apr. 26, 2010, in U.S. Appl. No. 11/222,928, 27 pgs.
Office Action mailed Nov. 24, 2009, in U.S. Appl. No. 11/222,928.
Final Office action mailed Feb. 1, 2010, in U.S. Appl. No. 11/325,372.
Office Action mailed Mar. 1, 2010, in U.S. Appl. No. 11/268,048, 19 pgs.

* cited by examiner

MULTIDIMENSIONAL CUBE FUNCTIONS

BACKGROUND

Spreadsheet software applications are used by many different users for manipulating data. Typical spreadsheet applications simulate physical spreadsheets by capturing, displaying, and manipulating data arranged in rows and columns. In addition to using spreadsheet applications, many users also store and utilize enormous amounts of data stored in multidimensional databases. These multidimensional databases are also known as OLAP cubes. These OLAP cubes are architecturally different from relational databases or object oriented databases and the language used to query and describe elements within the OLAP cubes is the Multi-Dimensional eXpression (MDX) language. OLAP systems analyze data drawn from other databases, often large relational databases such as data warehouses, or other multidimensional databases. The purpose of such analysis is to aggregate and organize business information into a readily accessible, easy to use multidimensional structure. Placing this multidimensional data within a PivotTable report within a spreadsheet is limiting because PivotTable reports are restrictive in their layout.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Cube functions may be used to obtain data from a multidimensional database. The cube functions may be contained within one or more cells of a spreadsheet and/or may be accessed through an API. The cube functions behave similarly to the standard functions that may be included within cells of a spreadsheet. Exemplary cube functions include, obtaining: a cube member, a cube value, a cube set, a ranked member, a KPI, a member property and a count of items in a set. Data may be obtained from one or more multidimensional databases. The cube functions may be executed asynchronously such that a user may continue to interact with the spreadsheet while the requested data is being obtained from one or more of the multidimensional databases. The cube functions may take parameters that may include other spreadsheet cell references as well as other cube functions. The use of the cube functions enables the spreadsheet program to be used as a reporting tool for multidimensional (OLAP) data stores. Using the cube formulas in individual cells allows the user to add/delete rows and/or columns from within the spreadsheet.

BRIEF DESCRIPTION OF THE DRAWINGS

FIGS. 6 and 7 show an exemplary spreadsheet that includes cube functions before evaluation and after evaluation, in accordance with aspects of the present invention.

DETAILED DESCRIPTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Throughout the specification and claims, the following terms take the meanings explicitly associated herein, unless the context clearly dictates otherwise. The term "MDX" refers to the MultiDimensional eXpressions language. The term "KPI" refers to a Key Performance Indicator. The term "MDX Name" is a name as defined by MDX. The MDX unique name of a member is generally in the form [Dimension].[Hierarchy].[Level].&[MemberKey] wherein all of these components are required. Non-unique names could have several other forms including [Member] or [Dimension].[Member] or [Dimension].&[98765]. The term "caption" refers to a non-unique friendly name to be displayed in the spreadsheet. The term "connection" refers to the name of a data connection that has been stored within a spreadsheet workbook. Connection names are strings that uniquely identify connections within the workbook in which they are used. The term "cube" refers to the multi-dimensional OLAP database from which data is retrieved. The term "member" is a value along one of the cube's dimensions. For example, a member of a Time dimension might be "June 2003". A member of a customers dimension might be "John Doe." The term "tuple" is the intersection of one or more members in a cube, with only one member from each dimension. The tuple represents the slice of the cube that includes the specified members. When a tuple contains only one member then that member and the tuple are identical to each other. The MDX Name for a tuple is of the form (<member1>, <member2>...<memberN>) where each <member> is replaced with the MDX name of that member. When the spreadsheet refers to a range of cells that contain members (or tuples) these ranges are interpreted as tuples. For example, if cells A10 thru A13 of a spreadsheet contain members, then the cube function=CubeValue ("MyConnection", $A10:$A13, D$2) has a tuple as its second argument. The term "set" is an ordered collection of one or more members (or tuples).

Briefly described, cube functions may be used to access data from a multidimensional database. According to embodiments, users can enter one or more cube functions into one or more of the spreadsheet cells, specify a multidimensional database, query a selected database, and then return the data to be used within the cell(s) of the spreadsheet. According to one embodiment, the data may be an aggregated value, a dimension member, a KPI, or a member property. The use of these cube functions enables the spreadsheet program to be more easily used as a reporting tool for multidimensional OLAP data stores. Using the cube functions within the individual cells of the spreadsheet provides far greater layout and formatting flexibility than using other methods which enforce limitations on the layout of the spreadsheet.

Figure 1:
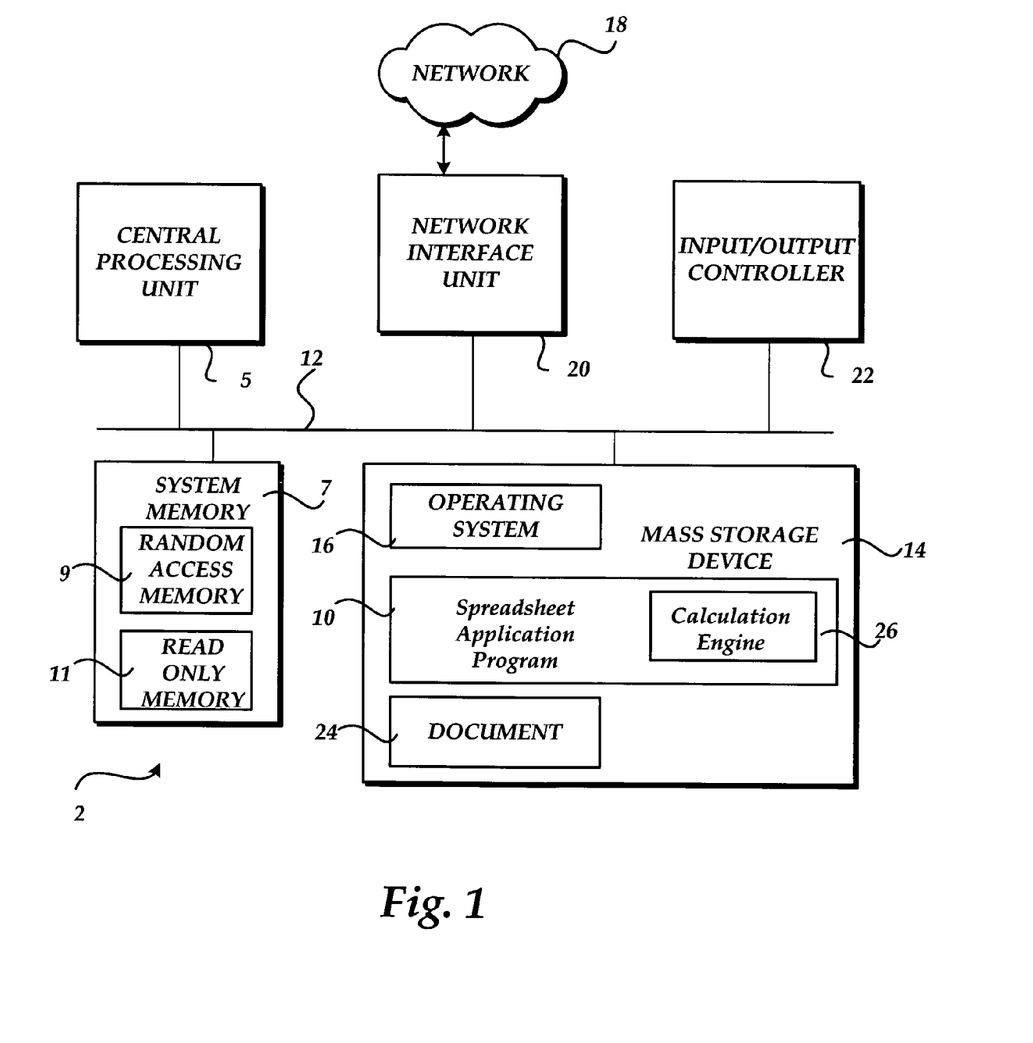
FIG. 1 illustrates an exemplary computing architecture for a computer.

Referring now to FIG. 1, an exemplary computer architecture for a computer 2 utilized in various embodiments will be described. The computer architecture shown in FIG. 1 may be configured in many different ways. For example, the computer may be configured as a server, a personal computer, a mobile computer and the like. As shown, computer 2 includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, the computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments, the computer 2 operates in a networked environment using logical connections to remote computers through a network 18, such as the Internet. The computer 2 may connect to the network 18 through a network interface unit 20 connected to the bus 12. The network interface unit 20 may also be utilized to connect to other types of networks and remote computer systems.

The computer 2 may also include an input/output controller 22 for receiving and processing input from a number of devices, such as: a keyboard, mouse, electronic stylus and the like. Similarly, the input/output controller 22 may provide output to a display screen, a printer, or some other type of device (not shown).

As mentioned briefly above, a number of program modules and data files may be stored in the mass storage device 14 and RAM 9 of the computer 2, including an operating system 16 suitable for controlling the operation of a networked computer, such as: the WINDOWS XP operating system from MICROSOFT CORPORATION; UNIX; LINUX and the like. The mass storage device 14 and RAM 9 may also store one or more program modules. In particular, the mass storage device 14 and the RAM 9 may store a spreadsheet application program 10, such as the MICROSOFT® EXCEL spreadsheet application. According to one embodiment, the spreadsheet application 10 is operative to provide functionality for interacting with an OLAP data store through the use of cube functions that are entered into one or more cells of spreadsheet application 10. The spreadsheet may generate one or more requests to fetch data from an OLAP cube identified by the cube function contained within the cell and populate a cell when there are cube functions contained within one or more cells of the spreadsheet.

The spreadsheet application 10 is configured to receive user input. For example, a user enters item data into a spreadsheet via a graphical user interface. The user input can be item data, item metadata, function information, cube function information, or other data. The user input may be direct input created by the user typing, pasting, or other deliberate action entering data into the spreadsheet or indirect input that may be generated by another program.

Calculation engine 26 performs operations relating to the cells within the spreadsheet. According to one embodiment, calculation engine 26 is a component within the spreadsheet application 10. The calculation engine 26, however, may be located externally from the spreadsheet application 10. The operations performed by calculation engine 26 may be mathematical, such as summation, division, multiplication, etc., or may include other functions or features, such as interacting with a multidimensional data store. Calculation engine 26 may be configured to perform many different operations.

Figure 2:
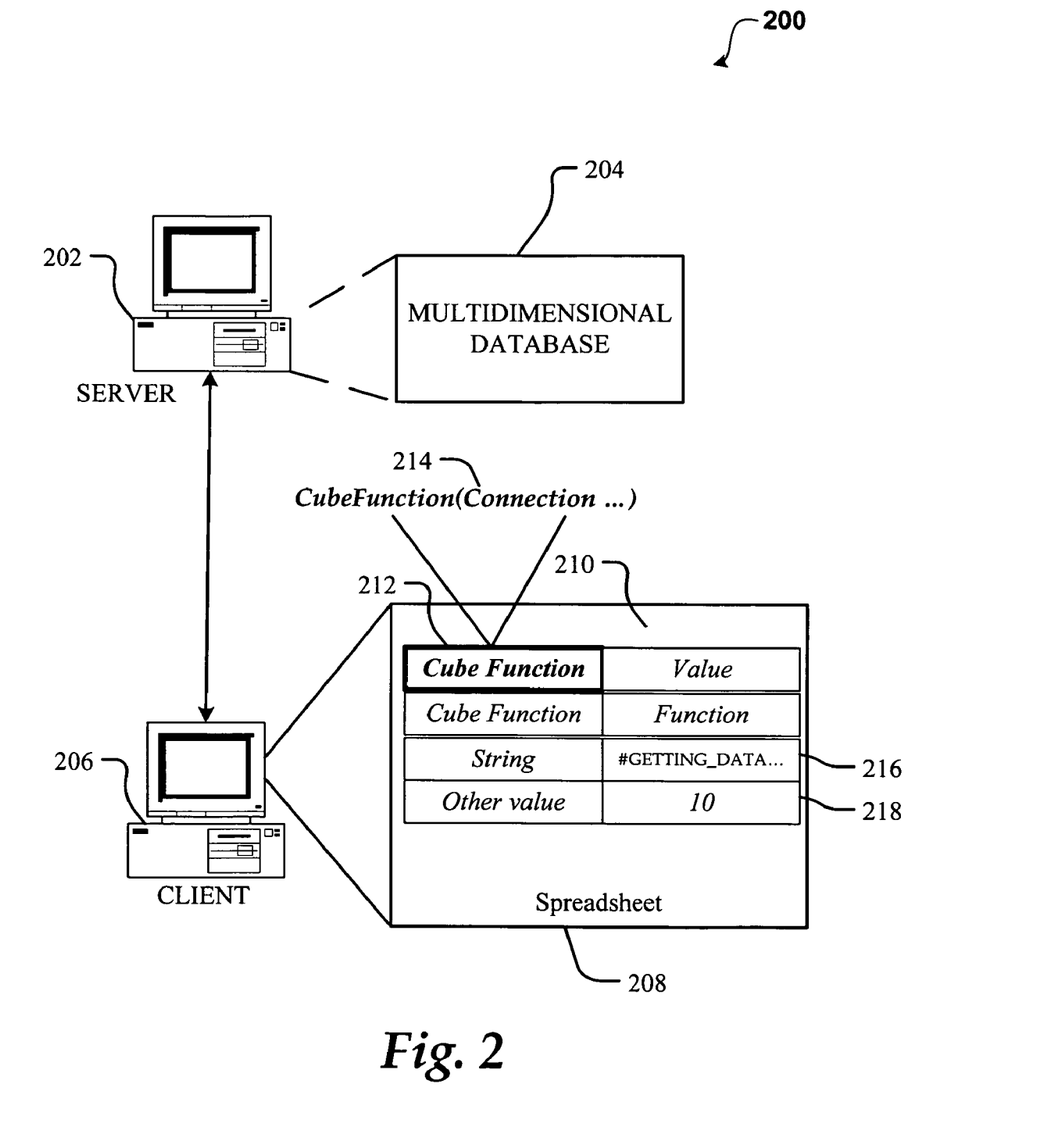
FIG. 2 illustrates an overview of a spreadsheet system for accessing multidimensional data through the use of cube functions.

FIG. 2 illustrates an overview of a spreadsheet system 200 for accessing multidimensional data through the use of cube functions, in accordance with aspects of the invention. As illustrated, system 200 includes a server 202, which includes and/or is coupled to a multidimensional database 204, such as an OLAP data store. Server 202 is coupled to client 206 through a network connection. Client 206 includes a spreadsheet application 208. Spreadsheet application 208 includes spreadsheet cells 210. Typically, an active cell 212, which is highlighted by the dark border, is the cell within the spreadsheet that is currently being acted upon. For example, the user is entering a cube function into the cell. Zero or more of the spreadsheet cells may contain a cube function which is directed at interacting with and retrieving data from the multidimensional database 204. According to one embodiment, each cube function includes a Connection parameter 214 that identifies the multi-dimensional database to access. According to one embodiment, the user may select a UI element, such as a dropdown, to choose from a list of available connections to OLAP cubes. The selected value is then included within the cube function.

Communication between the spreadsheet application and the OLAP database 204 may be accomplished using MDX. Any other language, however, may be utilized that can communicate with an OLAP database. Furthermore, although the application is described herein as a spreadsheet, it will be appreciated that other applications, such as word processing applications that include spreadsheet cells, as well as other applications utilizing cells, may utilize the cube functions described herein. According to another embodiment, the cube functions may be maintained separately from an application and may be accessed through an API.

Generally, a user may enter cube functions within one or more of the cells within spreadsheet 208 to fetch data from the OLAP database 204. The queries to retrieve the data from the OLAP cube(s) that are sent may be MDX expressions. Each of the cube functions includes connection information that specifies the appropriate database.

The cells within the spreadsheet that contain cube functions appear to the user to behave as any other cell within the spreadsheet that contains a formula. Generally, formulas within the spreadsheet can include the following: cube functions as defined herein that directly query an OLAP cube; dependent cube functions that query an OLAP cube but that also require the results of a different query as one of their arguments; standard spreadsheet functions that have a dependency on the values returned by the cube functions; and standard spreadsheet functions that have no dependency.

If each of these cube functions is independently executed within the spreadsheet then there may be a large number of small queries against the OLAP server. This could result in diminished performance for the spreadsheet application. According to one embodiment, the queries are combined into fewer queries such that fewer queries are made to the OLAP server.

The spreadsheet cell calculations may be performed asynchronously. In other words, while data is being fetched from the OLAP server the calculations may continue within the other cells. Therefore, the calculations proceed for the cells that have no dependency on the result set, but are delayed for cells that are dependent. If the cell has no dependency on a query, the cell will get its value right away (218). If the cell has a dependency on a query, the cell is filled with a temporary error value of "#GETTING_DATA..." (216) and the calculation proceeds to the next cell in the chain. This error shows the user that an action is being performed that relates to the cell.

When all of the cells have been evaluated, the spreadsheet triggers the aggregated query(s) needed to obtain data. This query is run asynchronously whenever possible. Asynchronous query processing may be desired so that the query won't block the spreadsheet applications UI thread and users can continue to work with the UI and can even abort the query when it's taking too long. As the values arrive for the cells that display the #GETTING_DATA... 216 error message, the error message is replaced with the fetched external data values and the calc is triggered for the cells that were dependent on the value that came in.

Figure 3:
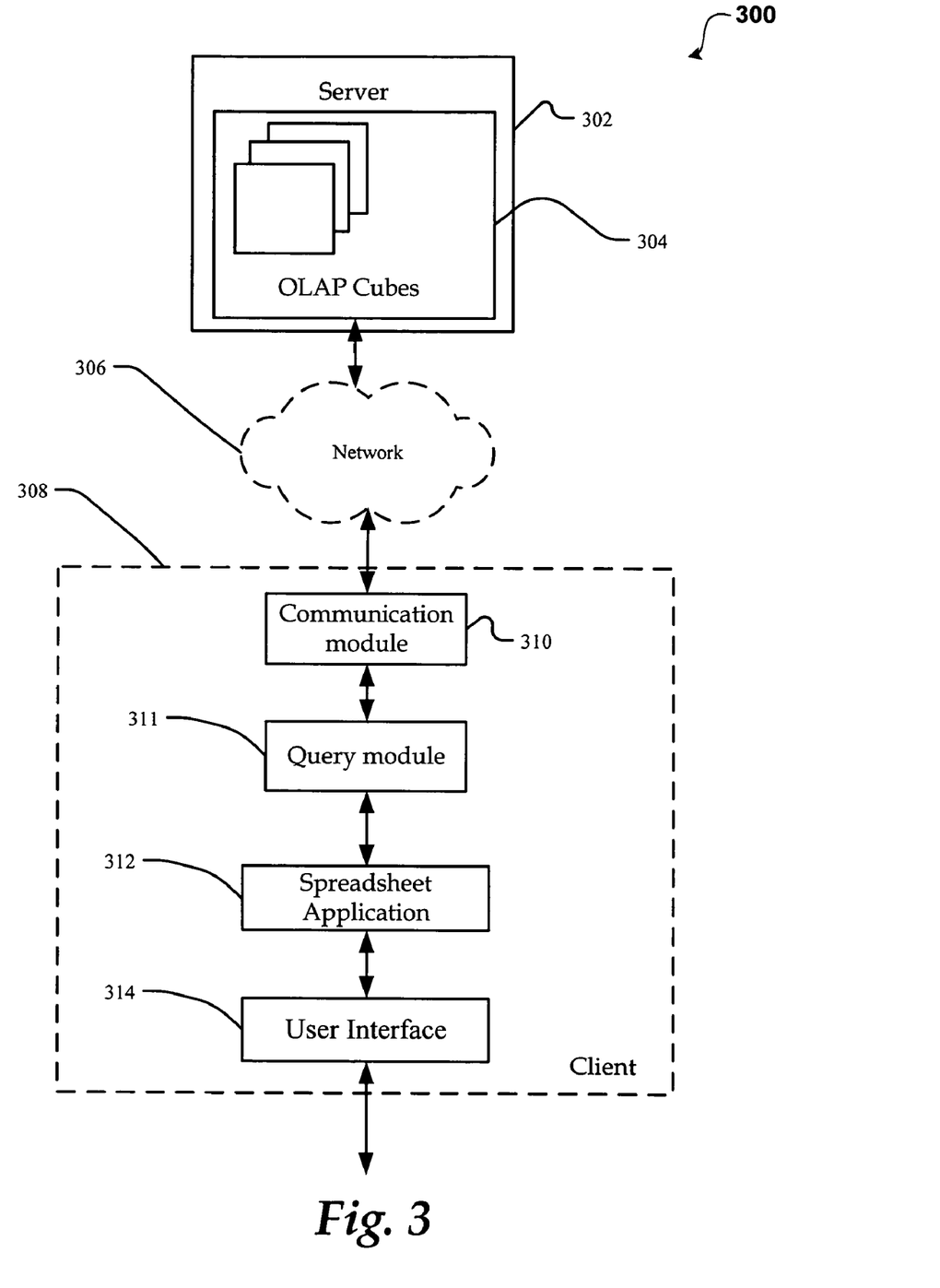
FIG. 3 illustrates a system for interfacing with OLAP cubes from cells of a spreadsheet application.

FIG. 3 illustrates a system 300 for interfacing with OLAP cubes from cells of a spreadsheet application, in accordance with aspects of the invention. System 300 in this embodiment includes a server 302 which correspondingly has one or more databases stored thereupon 304. System 300 may optionally include a network 306 such as a LAN, WAN, the Internet or other network which server 302 may be coupled to.

System 300 includes client 308. Client 308 includes a communication module 310 that is coupled to a spreadsheet application 312. Furthermore, communication module 310 is coupled to the network 306. Communication module 310 may also be directly coupled to server 302 and/or directly to OLAP cube(s) 304.

When a user configures a new spreadsheet in spreadsheet application 312, they may chose from a list of OLAP cubes 304 to which it may connect. Alternatively, the user may type in the location of an OLAP cube to be connected. This link may then be given a connection name, such that this name is used by a query module 311 to construct a query for the named OLAP cube. Query module 311 is configured to receive the cube function(s) from one or more cells within the spreadsheet application and then construct an MDX query that will be passed on to server 302 (via communication module 310) to be interpreted. The appropriate cube 304 is then queried and, in response to the query, returns data from the database relating to the query to communication module 310. Communication module 310 then passes the data to the spreadsheet application 312, which in turn fills in the cell(s) with the data. When other cells within the spreadsheet depend upon the returned data, those cells may then be updated.

Communication module 310 may be located on client 308, however it may also be included on server 302 or may be included in cube(s) 304, among other locations. Communication module 310 is typically provided by cube(s) 304 such that the client 308 and spreadsheet application 312 may communicate with the cube(s) 304. In one embodiment, communication module 310 may comprise a dynamic-link library (DLL) that is provided (and configured) by the particular linked cube.

While query module 311 is shown as being separate from spreadsheet application 312, it may be included within the spreadsheet application 312. The location of query module 311 may also be other than in the client 308, such as within the server 302, or at some remote location.

Figure 4:
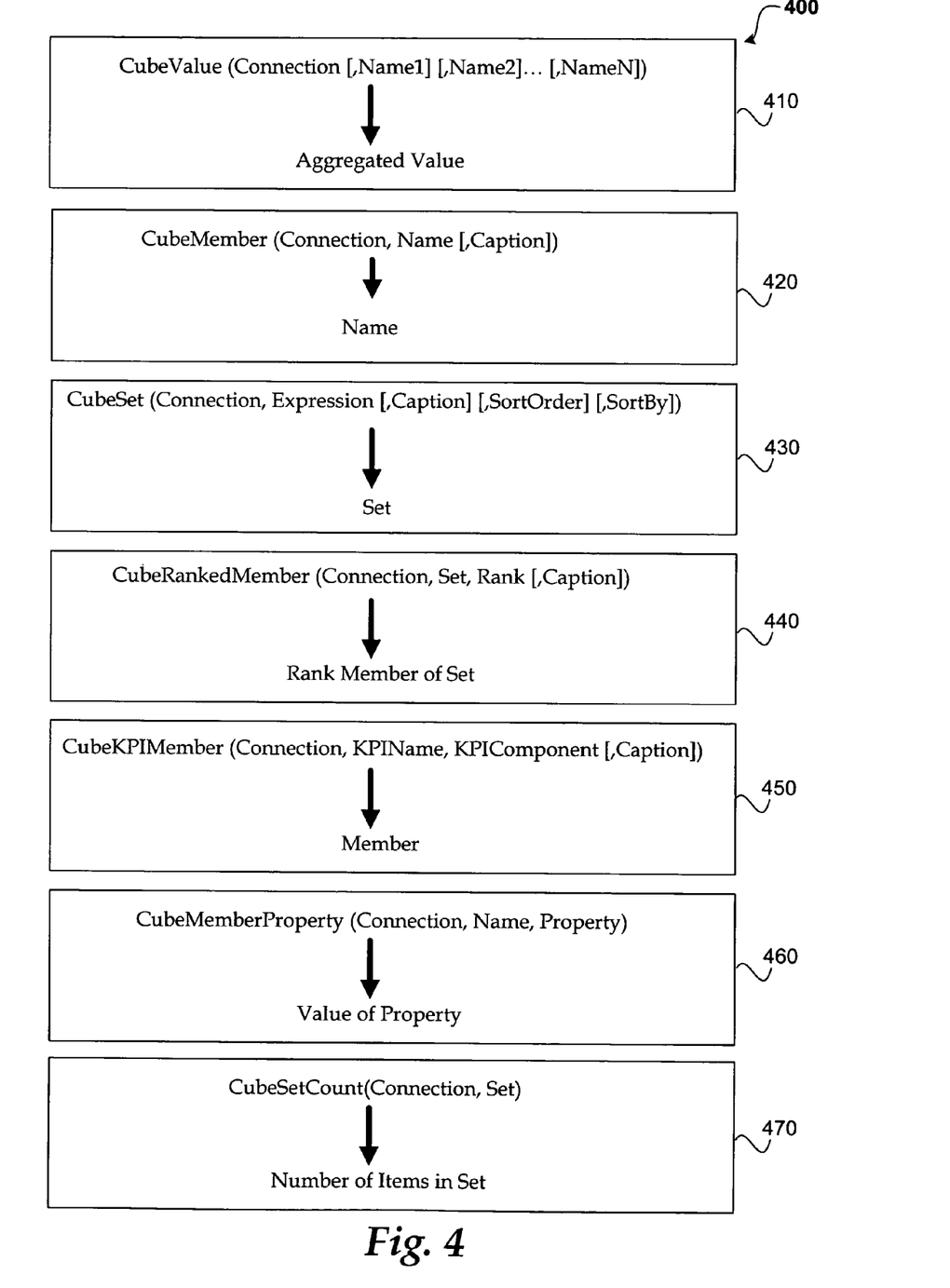
FIG. 4 illustrates cube functions that may be utilized to connect with a multidimensional database.

FIG. 4 illustrates cube functions that may be utilized to connect with a multidimensional database, in accordance with aspects of the invention.

As illustrated, FIG. 4 includes the following cube functions: cube value function 410; cube member function 420; cube set function 430; cube ranked member 440; cube KPI member 450; cube member property 460; and cube set count 470.

CubeValue (Connection [,Name1] [,Name2]... [,NameN]) function 410 returns an aggregated value from the OLAP cube specified by the connection parameter. The "Name" parameter is an optional parameter that may appear any number of times within the CubeValue function call. For example, one cube value function call may contain only one name, while another cube value function call may contain many names, separated by commas. According to one embodiment, each name is the MDX name of a member or tuple (or tuple) within the cube. Alternatively, the name could be a Set as defined by a CubeSet function as described below. The provided names are used as slicers to define the portion of the cube for which an aggregated value is to be returned. According to one embodiment, if a Name is not supplied for any particular hierarchy, then the default member for that hierarchy is used. Similarly, when a Name is not supplied for any measure, then the default measure for the cube is used. The Name parameter may also be a cell reference to another cell in the spreadsheet that contains a unique MDX name in the cell's MDX property. Any cells that contain the CubeMember( ) function evaluate to a caption plus a unique MDX name in the cell's MDX property.

According to one embodiment, the tuple associated with any CubeValue is stored. This increases the efficiency to communicate with the OLAP server about the portion of the cube that's associated with the desired value. The following are some illustrative examples of the CubeValue( ) function: CubeValue ("SALES", "[Measures].[Profit]", "[Time].[1999]", "[All Product].[Beverages]"); CubeValue ($A$1, "[Measures].[Profit]", D$12, $A23); and CubeValue ("SALES", $B$7, D$12, $A23).

The CubeMember (Connection, Name [,Caption]) function 420 returns a fully qualified unique MDX member name, or MDX tuple, as well as the user-friendly caption for that member. According to one embodiment, when a tuple is returned, the user-friendly caption is the caption of the last member in the tuple. Evaluating this function causes the cell to display the caption, while the cell's MDX property is set to the unique MDX member name or MDX expression for the tuple. The CubeMember function returns an error (#N/A) when the specified Name is not found within the specified cube. The Name parameter is a string containing the MDX member name of a member within the cube. The CubeMember function validates that the provided name exists within the cube and then returns the unique member name associated with this member as the MDX property along with that member's caption as the function's value. This argument may also represent a tuple. When the argument is a tuple, the user specifies an array of members using the spreadsheet's array syntax. The name argument may also be a reference to a cell that contains a member, or a cell that contains a string which evaluates to a unique MDX name, or a range of cells which will evaluate to a tuple. The Caption parameter is an optional string to be used as the caption in place of any caption that we obtain from the cube.

The following are some illustrative examples of the CubeMember( ) function: CubeMember ("conn", "[Customers].[USA]"); and CubeMember("Finance",[Account].[Accounts].[NetIncome].[Operating Profit].[Gross Margin].[Net Sales].[Gross Sales]).

The CubeSet (Connection, Expression [,Caption] [,SortOrder] [,SortBy]) function 430 defines a set that is to be built for the spreadsheet by the OLAP server. The CubeSet function sends the Expression to the OLAP server defined by the specified Connection. The server then creates a set by evaluating the Expression and returns that set to the spreadsheet program. The spreadsheet then uses the Caption as the function's display value, while also setting the function's MDX (value) metadata to the MDX Expression that was sent to the OLAP server.

The Expression parameter is a string containing any arbitrary MDX expression that can be evaluated by the OLAP server which results in a set of members or a set of tuples. An expression can also be a cell reference to a range that contains one or more cube members or tuples or sets. The Expression argument defines the items that are to be included in the set.

The Caption parameter is the optional string to be used as the caption that describes the set being created. When the caption is not provided, then the caption is set to a null string.

The SortOrder parameter is an optional integer argument whose value, according to one embodiment, is one of the following:

| | |
|---|---|
| 0=SORT_NONE | Leaves the Set in it's existing order |
| 1=SORT_ASCENDING | Sorts Set in ascending order by SortBy field |
| 2=SORT_DESCENDING | Sorts Set in descending order by SortBy field |
| 3=SORT_ALPHA_ASCENDING | Sorts Set in Alpha ascending order |
| 4=SORT_ALPHA_DESCENDING | Sorts Set in Alpha descending order |
| 5=SORT_NATURAL_ASCENDING | Sorts Set in Natural ascending order |
| 6=SORT_NATURAL_DESCENDING | Sorts Set in Natural descending order |

The SortBy parameter is an optional expression string that defines the values on which sorting is to be done. For example, if a user would want to obtain the city with the highest sales, then the Expression parameter defines a set of cities, and the SortBy parameter is the sales measure. If the user wants to obtain the city with the highest population, then the Expression parameter defines a set of cities, and the SortBy parameter is the population measure. The CubeSet function results in a set containing the items defined by the Expression parameter in the specified SortOrder by SortBy.

The following are some illustrative examples of the CubeSet( ) function: CubeSet("Finance", "Order([Product].[Product].[Product Category].Members, [Measures].[Unit Sales], ASC)", "Products"); and CubeSet("Sales", "[Product].[All Products].Children", "Products", 1, "[Measures].[Sales Amount]").

The CubeRankedMember (Connection, Set, Rank [,Caption]) function 440 returns the Nth (Rank) cube member (or tuple) in a Set, with the Caption as the display value, and a unique MDX name as the cell's MDX property. The Set is an expression that evaluates to a set within an OLAP cube. In order to obtain this set, the CubeSet( ) function may be used. This means that Set may be a reference to a cell that contains a CubeSet( ) function. In some OLAP servers, such as MICROSOFT CORPORATION'S Analysis Services a set may be defined by an expression within curly braces: such as "{[Item1].children}". The CubeRankedMember function returns one of the elements within the Set. The Rank parameter is an integer that determines the element within the set to return. When the Rank parameter is set to one then the CubeRanked Member function returns the first value. When the Rank parameter equals two then the second value is returned, and so on. For example, calling this function five different times with the Rank parameter set to 1 thru 5 is one way to obtain the "Top 5" items from an OLAP cube. The Caption parameter is an optional string to be used as the caption in place of the member caption as obtained from the OLAP cube.

The following are some illustrative examples of the CubeRankedMember( ) function: CubeRankedMember ($D$4, 1, "Top Month"); and CubeRankedMember (CubeSet ("SALES", "Summer", "[1999].[June]", "[1999].[July]", "[1999].[August]"), 1, "Top Month").

The CubeKPIMember (Connection, KPIName, KPIComponent [,Caption]) function 450 returns the KPI specified by the KPI name and the KPI Component. According to one embodiment, this KPI includes a fully qualified unique MDX expression as well as the user-friendly caption for that KPI. Evaluating CubeKPIMember function causes the cell's value within the spreadsheet to be set to the caption, while the cell's MDX property is set to the unique MDX expression for the requested KPI. The CubeKPIMember function returns an empty string caption and has a NULL MDX property when the specified KPIName is not found within the specified OLAP cube. The KPIName is the name of the KPI in the cube that is to be queried. The KPIComponent is one of the following values: 1—KPIValue; 2—KPIGoal; 3—KPIStatus; 4—KPITrend; 5—KPIWeight; and 6—KPICurrentTimeMember. These are the components (properties) that make up a KPI. This Caption is an optional string to be used as the caption in place of any caption that is obtained from the cube. To obtain the value of a KPI member with additional slicers as appropriate, the user may use the CubeValue function, and references this KPI just as if it were a member of any hierarchy in the cube.

The following are some illustrative examples of the CubeKPIMember( ) function: CubeKPIMember ("Sales", "MySalesKPI", 1); and CubeKPIMember ("Sales", "MySalesKPI", 2, "Sales KPI Goal").

The CubeMemberProperty (Connection, Name, Property) function 460 returns the value of a member property in the cube. The Name is the MDX unique name of a member within the cube. The CubeMemberProperty function validates that the name exists within the cube and then returns the specified property for this member. The Property is the MDX name of the property to be returned or a reference to a cell that contains the name of the property.

The following are some illustrative examples of the CubeMemberProperty ( ) function: CubeMemberProperty ("Sales", "[Time].[Fiscal].[1999]", $A$3); and CubeMemberProperty ("Sales", "[Store].[MyFavoriteStore]", "[Store].[Store Name].[Store Sqft]").

The CubeSetCount(Connection, Set) function 470 returns the number of items in the Set. The Set is an expression that evaluates to a set as defined by the CubeSet function. In many cases, the cell will contain a CubeSet function. The following are some illustrative examples of the CubeSetCount ( ) function: CubeSetCount (A3) and CubeSetCount (CubeSet (connection1, expression1, caption)).

When the Cube function is CubeSet or CubeSetCount, the MDX property is the MDX expression that is sent to the server for evaluation. It is the same as the Expression argument for the CubeSet function. For example: Cell C3 contains: =CubeSet("conn", "[Customers].children"); Cell C4 contains: =CubeSetCount(C3); Range ("C3").MDX="[Customers].children" and Range ("C4").MDX="[Customers].children."

When the Cube function is CubeMember, CubeRankedMember, CubeValue, CubeKPIMember or CubeMemberProperty, then the MDX property provides a tuple as returned from the server representing the unique name of the member or tuple defined by the function. For example: Cell C3 contains: =CubeMember ("conn", "[Customers].[USA]"); Cell C4 contains: =CubeValue("conn", "[Bicycles]", "[WA]"); Range ("C3").MDX=(<unique member name for USA>) as returned by server; and Range ("C4").MDX=(<tuple containing unique member names for Bicycles and WA>).

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

Figure 5:
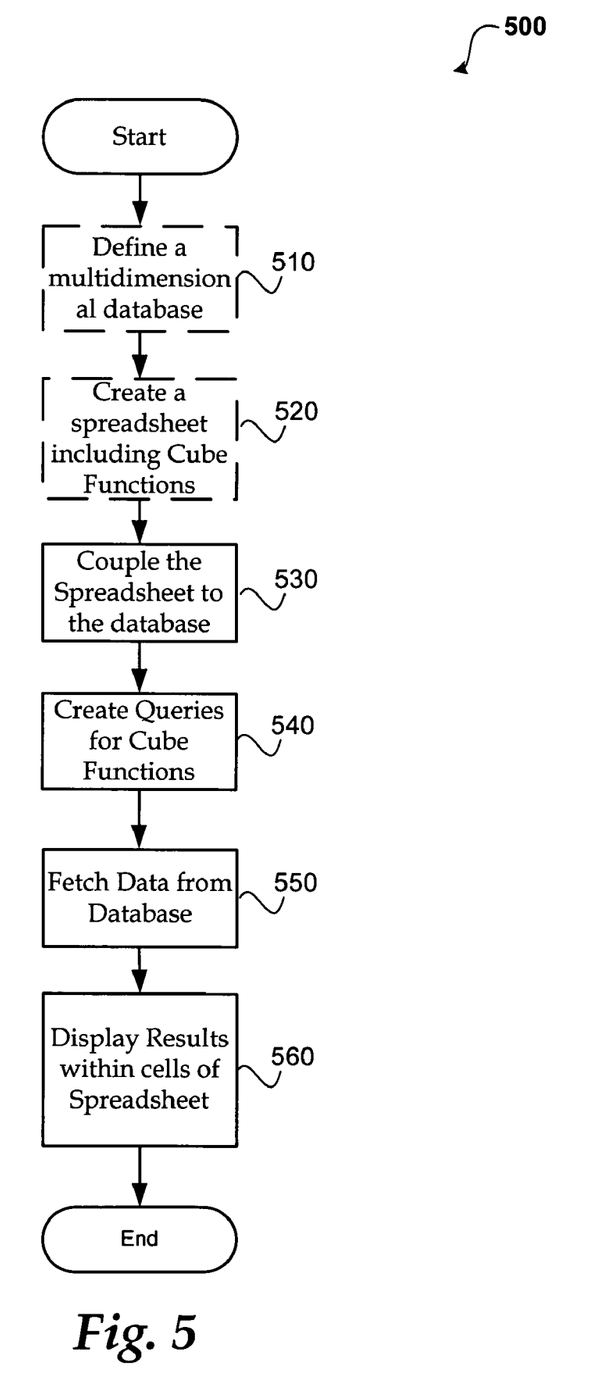
FIG. 5 displays an operational flow for using cube functions within a spreadsheet.

FIG. 5 displays an operational flow 500 for using cube functions within a spreadsheet, in accordance with aspects of the invention. After a start block, the process flows to define operation 510, which defines a multidimensional database. A database is defined or created when the particular coordinates are defined and saved, and the data fields populated. Typically, the multidimensional databases are OLAP databases that have already been created and populated. In this case, the selected databases are coupled to the spreadsheet at operation 530.

Moving to operation 520, a spreadsheet is created that includes cube functions. Generally, a user may create a spreadsheet from scratch in which all of the cells within the spreadsheet are defined, but, typically, a user may start with a spreadsheet that has at least been partially created. According to one embodiment of the invention, a cell may include zero or more of the following cube functions: a cube member function; a cube value function; a cube set function; a cube ranked member function; a cubed KPI member function; a cube member property function; and a cube set count function as described more fully herein.

Flowing to operation 530, the spreadsheet is coupled to the database. When the spreadsheet is created and particular cells are defined within the spreadsheet to include cube functions, different databases may be linked to the information in that cell and/or spreadsheet. In this way, each cell containing a cube function may fetch data from the appropriate OLAP data store.

Transitioning to operation 540, queries are created for the cube functions within the cells of the spreadsheet. According to one embodiment, the queries are in the form of MDX queries.

Moving to operation 550, the queries are used to fetch the data relating to the cube functions from one or more multidimensional data stores. The cells within the spreadsheet may then be populated with the fetched data.

At operation 560, the results of the queries and any calculations that were performed may be displayed to the user. The process then moves to an end block and returns to processing other actions.

Figure 7:
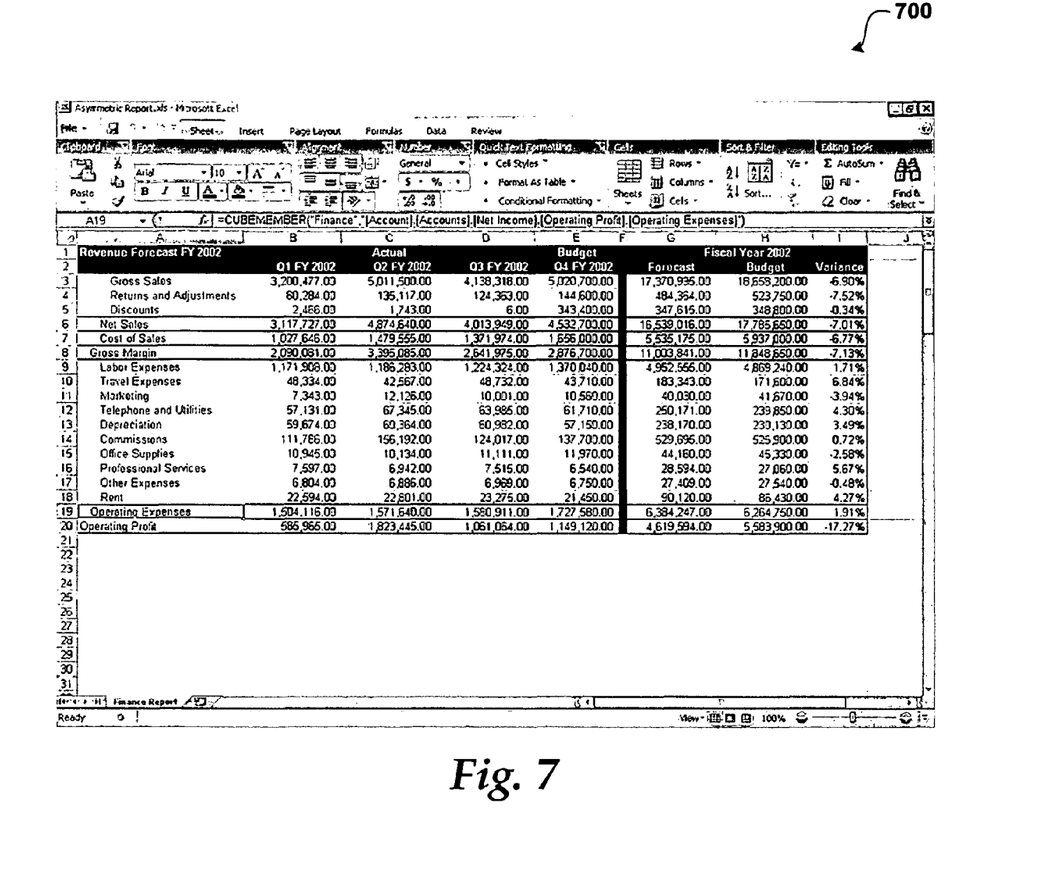

FIGS. 6 and 7 show an exemplary spreadsheet that includes cube functions before evaluation and after evaluation, in accordance with aspects of the invention. FIG. 6 shows the cube function text within the cells. FIG. 7 shows the result of calculating the cube functions.

As illustrated, each cell within spreadsheet 600 and 700 includes a cube function. Including a cube function within each cell of the spreadsheet is merely for illustrative purposes. The spreadsheet may have zero or more cube functions contained within the cells. For example, a spreadsheet may include only a single cube function to obtain a single value from an OLAP cube.

Referring to a few of the cells within spreadsheet 600 it can be seen that cell A3 includes the cube member function that connects to the finance database and includes an MDX expression "[Account].[Accounts].[Net Income].[Operating Profit].[Gross Margin].[Net Sales].[Gross Sales]." As can be seen referring to spreadsheet 700 in FIG. 7, cell A3 is displayed as "Gross Sales." Cell B3 includes a cube value function that obtains the values from the $A$1, $B$1, B$2, and $A3 that results in an aggregated value of 3,200,477.00 as displayed in cell B3 of spreadsheet 700. As illustrated each cube function has connection information to the "Finance" OLAP cube. As discussed above, however, each spreadsheet may have zero or more cube connections. For example, one cell could include a cube function to obtain data from a first OLAP cube and another cell could include a cube function to obtain data from a second store.

Using cube functions within the spreadsheet allows the users to insert and/or delete rows and columns without interfering with the data's ability to be refreshed.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for retrieving data from a multidimensional database, comprising:
obtaining a cube function from a cell within a spreadsheet having cells; wherein the cube function is directed at obtaining data from a multidimensional database and wherein the cell behaves similarly to the other cells within the spreadsheet having functions that perform other functions;
wherein the cube function is selected from a set of cube functions comprising:
a cube member function that identifies an item in the multi-dimensional database and returns a fully qualified unique Multi-Dimensional eXpression (MDX) name for the member and a user-friendly caption for the member;

a cube value function that returns an aggregated value from the multidimensional database, wherein a parameter to the cube value function is a MDX name of a member within the multidimensional database, wherein the name is used as a slicer to define the portion of the cube for which the aggregated value is to be returned;

a cube set function that defines a set that is to be built for the spreadsheet by an Online analytical processing (OLAP) server storing the multidimensional database, wherein a parameter to the cube set function is an MDX expression; and a member property function that identifies a value of a member property in the multi-dimensional database and a count relating to a set within the multidimensional database, wherein a parameter to the member property function is an MDX unique name of a member;

wherein the cube function within the cell includes a connection parameter that is included within the cell that specifies the multidimensional database to access; wherein the connection parameter identifies the multidimensional database to access and wherein each cube function that is included within the spreadsheet can access a different multidimensional database;

generating an MDX query as specified by the cube function;

connecting to the multidimensional database that is associated with the cube function;

obtaining the data from the multidimensional database as specified by the MDX query generated from the cube function; and placing the data within the spreadsheet cell.

2. The method of claim 1, wherein the cube member function further comprises a ranked member function that returns an Nth (Rank) cube member (or tuple) in a Set, with a Caption as the display value, and a unique MDX name as the cell's MDX property; and a KPI function that returns a KPI specified by a KPI name and a KPI Component.

3. The method of claim 1, further comprising calculating the cells within the spreadsheet asynchronously such that interaction with the spreadsheet may occur while the data is being obtained from the multidimensional database.

4. The method of claim 1, wherein connecting to the multidimensional database comprises obtaining a selection for the multidimensional database from a graphical user interface.

5. The method of claim 1, wherein the MDX query has a dependency on a spreadsheet function.

6. The method of claim 5, wherein obtaining the cube function from the cell within a spreadsheet having cells comprises obtaining each cube function that is contained within the cells of the spreadsheet; obtaining the data from the multidimensional database using the MDX query and placing a message within each of the cells including at least one of the cube functions while the data is being obtained.

7. The method of claim 5, wherein rows and columns may be deleted from the spreadsheet without interfering with the other cells within the spreadsheet to be refreshed.

8. A computer-readable storage medium having computer-executable instructions for interacting with an Online analytical processing (OLAP) cube, comprising:

obtaining a cube function from a cell within a spreadsheet having cells; wherein the cube function is directed at obtaining data from a multidimensional database and wherein the cell behaves similarly to the other cells within the spreadsheet having functions that perform other functions;

wherein the cube function is selected from a set of cube functions comprising:

a cube member function that identifies an item in the multi-dimensional database and returns a fully qualified unique Multi-Dimensional eXpression (MDX) name for the member and a user-friendly caption for the member;

a cube value function that returns an aggregated value from the multidimensional database, wherein a parameter to the cube value function is a MDX name of a member within the multidimensional database, wherein the name is used as a slicer to define the portion of the cube for which the aggregated value is to be returned;

a cube set function that defines a set that is to be built for the spreadsheet by an Online analytical processing (OLAP) server storing the multidimensional database, wherein a parameter to the cube set function is an MDX expression; and a member property function that identifies a value of a member property in the multi-dimensional database and a count relating to a set within the multidimensional database, wherein a parameter to the member property function is an MDX unique name of a member;

wherein the cube function within the cell includes a connection parameter that is included within the cell that specifies the multidimensional database to access; wherein the connection parameter identifies the multidimensional database to access and wherein each cube function that is included within the spreadsheet can access a different multidimensional database;

generating an MDX query as specified by the cube function;

connecting to the multidimensional database that is associated with the cube function;

obtaining the data from the multidimensional database as specified by the MDX query generated from the cube function; and placing the data within the spreadsheet cell.

9. The computer-readable storage medium of claim 8, further comprising calculating the data within the spreadsheet cell asynchronously.

10. The computer-readable storage medium of claim 8, wherein connecting to the multidimensional database comprises obtaining a name from the cube function and using the name to connect to the multidimensional database.

11. The computer-readable storage medium of claim 8, wherein the MDX query has a dependency on a spreadsheet function.

12. The computer-readable storage medium of claim 8, wherein obtaining the cube function from the cell within a spreadsheet comprises placing a message within the cell while the data is being obtained.

13. The computer-readable storage medium of claim 8, wherein rows and columns may be deleted from the spreadsheet without interfering with other cells within the spreadsheet to be refreshed.

* * * * *